(12) United States Patent
Lee

(10) Patent No.: US 10,306,846 B2
(45) Date of Patent: Jun. 4, 2019

(54) CONTAINER FOR CULTIVATING PEANUT SPROUTS

(71) Applicants: HY Co., Ltd, Seoul (KR); Young Taek Shin, Seoul (KR)

(72) Inventor: Chang Hwan Lee, Gangwon-do (KR)

(73) Assignees: HY Co., Ltd., Seoul (KR); Young Taek Shin, Seoul (KR)

(*) Notice: Subject to any disclaimer, the term of this patent is extended or adjusted under 35 U.S.C. 154(b) by 394 days.

(21) Appl. No.: 15/335,134

(22) Filed: Oct. 26, 2016

(65) Prior Publication Data
US 2018/0110194 A1 Apr. 26, 2018

(51) Int. Cl.
*A01G 31/02* (2006.01)

(52) U.S. Cl.
CPC ............ *A01G 31/02* (2013.01); *Y02P 60/216* (2015.11)

(58) Field of Classification Search
CPC ...................................................... A01G 31/02
See application file for complete search history.

(56) References Cited

U.S. PATENT DOCUMENTS

2017/0049062 A1* 2/2017 Van Such ............. A01G 29/00
2017/0105368 A1* 4/2017 Mehrman ............. A01G 31/06
2018/0338439 A1* 11/2018 Gao ...................... A01G 31/02

FOREIGN PATENT DOCUMENTS

KR 10-0698489 3/2007 ............. A01G 31/00

* cited by examiner

*Primary Examiner* — Monica L Williams
(74) *Attorney, Agent, or Firm* — Harness, Dickey & Pierce, P.L.C.

(57) ABSTRACT

The present disclosure relates to a container for cultivating peanut sprouts, comprising a container body which houses peanut sprout cultivation seedbeds for cultivating peanut sprouts, and forms a cultivation room; a bottom plate provided at the bottom of the container body to control temperature in the container body; and a water spray unit provided horizontally and vertically in the container body and for supplying water to the peanut sprout cultivation seedbeds, wherein the bottom plate is provided with a heating pipe in which hot water is circulated by means of a boiler.

3 Claims, 5 Drawing Sheets

CONTAINER FOR CULTIVATING PEANUT SPROUTS

FIELD

The present disclosure relates to a container for cultivating peanut sprouts, and more particularly to a container for cultivating peanut sprouts by creating an environment for cultivating peanut sprouts by a cultivator to cultivate the peanut sprouts.

BACKGROUND

Recently, there is an increasing interest in peanut sprouts as a dietary supplement. It is known that peanut sprouts are very effective to enhance human health. Peanut sprouts contain folic acid six times more than broccoli and resveratrol 50 times more than red wine. In addition, it is known that the fine roots of peanut sprouts contain saponins six times more than red *ginseng*, and aspartic acid eight times more than bean sprouts.

Therefore, they are widely used for treating prostatic diseases, anti-aging, preventing and treating cancers and menopausal disorders, supplementing folic acid for pregnant women, losing weight and recovering from too much drinking.

FIG. 1 illustrates the appearance of a peanut sprout. As shown FIG. 1, the peanut sprout is composed of a hypocotyl b, a plumule c and roots a which grow from a peanut. While the benefits of peanut sprouts are widely known, methods of mass-cultivating peanut sprouts have been studied.

The Korea Patent Registration No. 10-0698489 discloses a method of cultivating peanut sprouts.

However, the conventional disclosed method of cultivating peanut sprouts is difficult and complicated, and involves much labor and energy input when a cultivator cultivates peanut sprouts because of the water spray process which continues at 3-hour intervals in a greenhouse of hydroponic cultivation environment.

SUMMARY

In view of the above, the present disclosure provides a container system for cultivating peanut sprouts, in which all facilities required for cultivating peanut sprouts are integrated to control humidity and temperature with ease and thus mass-produce peanut sprouts of consistent quality.

The aforementioned objects and various advantages of the present disclosure will be apparent to those skilled in the art from the following preferred embodiments of the present disclosure.

The object of the present disclosure may be achieved with a container for cultivating peanut sprouts. The container for cultivating peanut sprouts may include a container body which houses peanut sprout cultivation seedbeds for cultivating peanut sprouts, and forms a cultivation room; a bottom plate provided at the bottom of the container body to control temperature in the container body; and a water spray unit provided horizontally and vertically in the container body and for supplying water to the peanut sprout cultivation seedbeds, wherein the bottom plate is provided with a heating pipe in which hot water is circulated by means of a boiler.

In accordance with an embodiment, the container unit may include a container housing; a door provided on one side of the container housing to be open and closed to allow a cultivator to enter and leave the container housing; a window provided on another side of the container housing to be open and closed for ventilation; a UV (ultraviolet) lamp provided in the container housing to emit UV radiation onto peanut sprouts; and seedbed benches for placing a plurality of peanut sprout cultivation seedbeds therein.

In accordance with another embodiment, the water spray unit may include a water supply pipe formed along the longitudinal direction in the upper part of the container housing; a plurality of nozzle modules placed at given intervals along the water supply pipe; and a water supply pump for supplying water in a water storage tank to the water supply pipe, wherein the nozzle modules include a horizontal pipe in which the nozzle modules are placed horizontally in the upper part of the container housing, and coupled with a plurality of horizontal nozzles; and a vertical pipe formed to be extended to the bottom surface of the container housing to be vertical to the horizontal pipe, and coupled with a plurality of vertical nozzles.

The container system for cultivating peanut sprouts in accordance with the present disclosure is integrated with facilities for water, lighting and heating required for cultivating peanut sprouts and a cultivator does not need to prepare additional apparatuses and may start to cultivate peanut sprouts immediately.

Furthermore, since the cultivator does not need other direct labor input than applying signals for power supply for the purpose of power supply, it is possible to reduce cultivator's physical burden for cultivating peanut sprouts.

In addition, since peanut sprouts are cultivated in a consistent environment with the container for cultivating peanut sprouts in accordance with the present disclosure, the consistent quality of peanut sprouts may be achieved.

DETAILED DESCRIPTION

Figure 1:
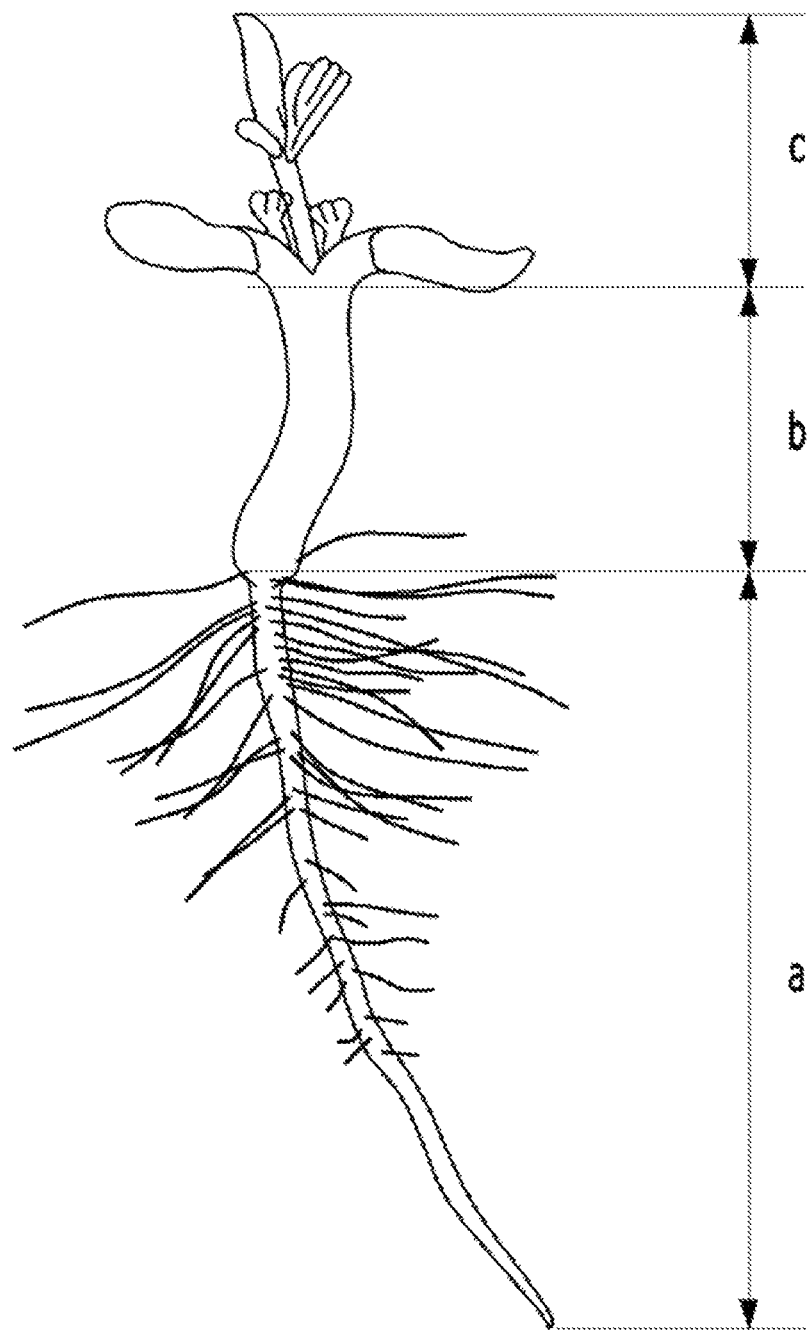
FIG. 1 schematically illustrates a cultivated peanut sprout.

Hereinafter, the preferred embodiments of the present disclosure will be described in detail with reference to the accompanying drawings. It should be noted that the embodiments of the present disclosure may be modified in various types, and the scope of the present disclosure should not be interpreted to be limited to the embodiments described in detail below. The embodiments are provided to describe the present disclosure more completely for those skilled in the art. Therefore, the shape of an element in the drawings may be exaggerated and represented to emphasize more accurate description. It should be noted that the same member may be denoted with the same reference number in each drawing. Detailed description about known functions and configurations is omitted where it is decided that the description may unnecessarily obscure the gist of the present disclosure.

Figure 2:
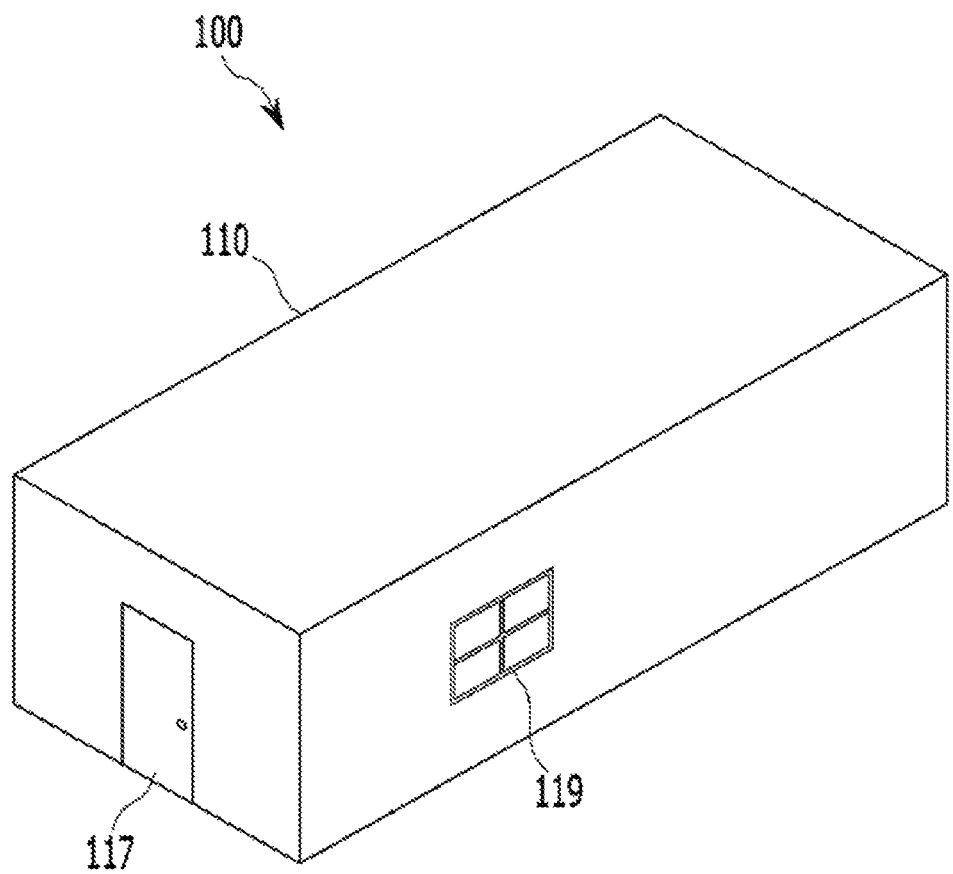
FIG. 2 is a perspective view of the external configuration of a container for cultivating peanut sprouts in accordance with the present disclosure.
Figure 3:
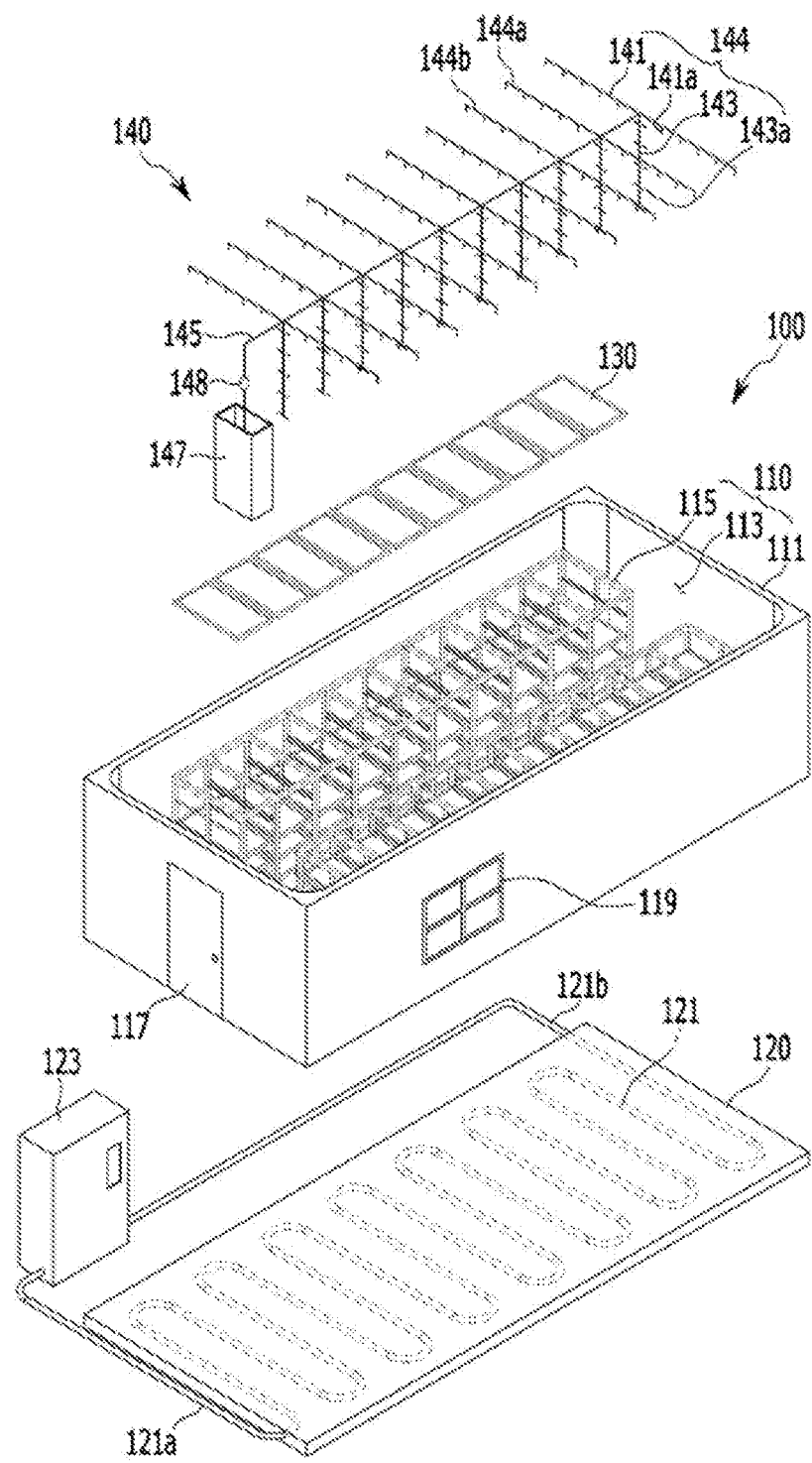
FIG. 3 is an exploded oblique view of the configuration of a container for cultivating peanut sprouts in accordance with the present disclosure.

FIG. 2 is a perspective view of the external configuration of a container 100 for cultivating peanut sprouts in accordance with the present disclosure, and FIG. 3 is an exploded oblique view showing the configuration of the container 100 for cultivating peanut sprouts in accordance with the present disclosure.

As shown in FIGS. 2 and 3, the container 100 for cultivating peanut sprouts in accordance with the present disclosure includes a container unit 110 which forms a cultivation space for cultivating peanut sprouts, a bottom plate 120 provided at the bottom of the container unit 110 for heating the inside of the container unit 110, a plurality of peanut sprout cultivation seedbeds 130 provided in the container unit 110 to support the peanut sprouts to be cultivated, and a water spray unit 140 for supplying water to the peanut sprout cultivation seedbeds 130.

The container 100 for cultivating peanut sprouts in accordance with the present disclosure may have an environment to allow a cultivator to cultivate peanut sprouts with ease without additional apparatuses since the container unit 110 is integrated therein with a heating facility, a water spray facility and a lighting facility required for cultivating peanut sprouts.

The container unit 110 provides a cultivation room 113 for cultivating peanut sprouts. A container housing 111 is formed as a type of housing of a given length. The container housing 111 is shaped as a conventional housing commercially available in the market, and is provided with materials for the interior on the inner surface thereof.

UV (ultraviolet) lamps 113a are placed in the upper part of the cultivation room 113 to emit UV radiation onto peanut sprouts in the cultivation room 113 when power is supplied in accordance with cultivator's management signals. The cultivation room 113 is kept dark while the door 117 is closed, and supplied artificially with UV radiation by means of the light emitted by the UV lamps 113a.

Seedbed benches 115 onto which the peanut sprout cultivation seedbeds 130 are loaded are placed right and left in the cultivation room 113. The seedbed benches 115 are formed with a plurality of layers and each layer thereof is placed with the peanut sprout cultivation seedbed 130.

The container housing 111 is provided externally with a window 119 to enable the cultivator to check the inside visually, and a door 117 to allow the cultivator to enter/leave the container housing 111.

The bottom plate 120 is placed at the bottom of the container housing 111. A heating pipe 121 through which hot water travels is inserted in the bottom plate 120. The bottom plate 120 is made of a material capable of transferring the heat of the heating pipe 121 to the inside of the container housing 111. The heat generated in the heating pipe 121 placed in the bottom plate 120 goes to the upper part of container housing 111 through convection and then raises the temperature in the container housing 111.

In this case, the hot water heated in the boiler 123 flows in through the hot water inlet pipe 121a of the heating pipe 121, and flows through the bottom plate 120. The cold water of which the temperature is lowered by means of heat exchange with the outside is discharged through the cold water discharge pipe 121b. The cold water discharged to the cold water discharge pipe 121b flows into the boiler 123.

Figure 5:
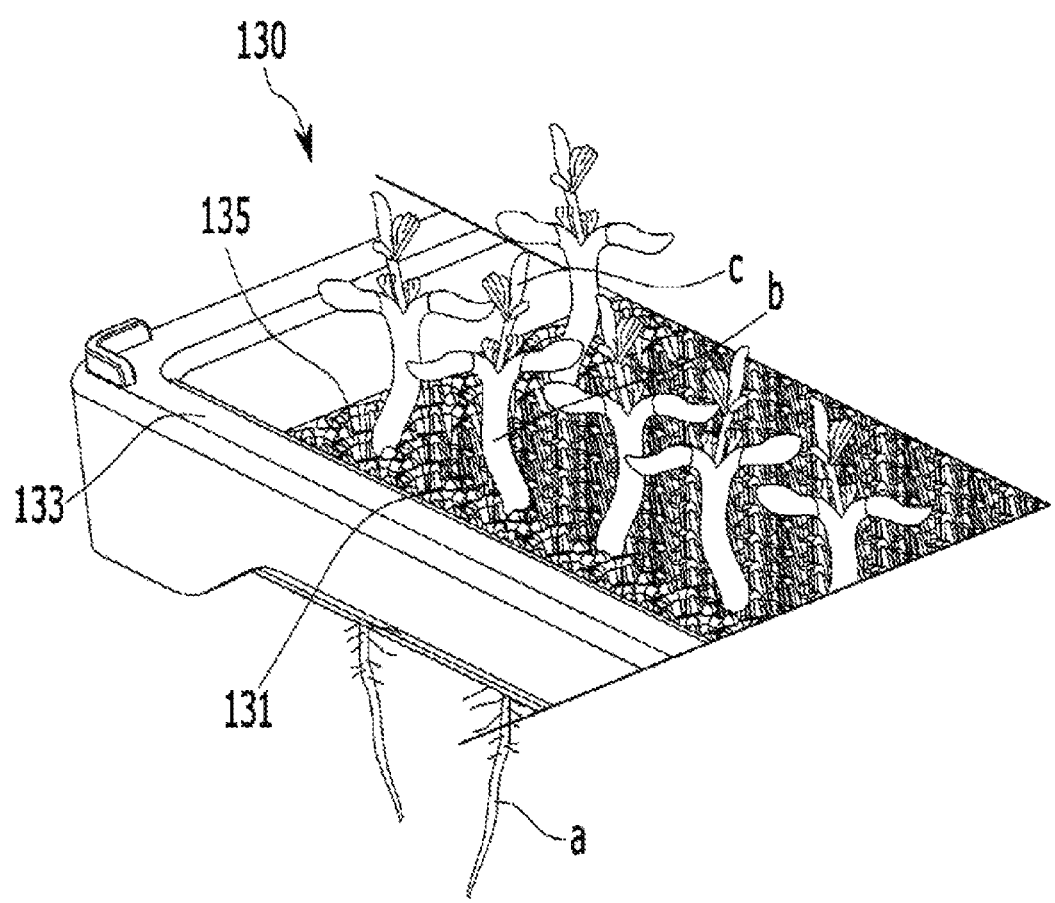
FIG. 5 illustrates peanut sprouts cultivated in a container for cultivating peanut sprouts in accordance with the present disclosure.

The peanut sprout cultivation seedbeds 130 support peanut seedlings so that the germinated peanut seedling can grow after being loaded. As shown in FIG. 5, the peanut sprout cultivation seedbed 130 includes a seedbed body 131 formed with the peanut sprout cultivation holes 135 which penetrate the seedbed body 131, and an edge member 133 provided at the edge area of the seedbed body 131.

The seedbed body 131 is manufactured by injection molding with synthetic resins, for example, PP. The seedbed body 131 is made with a plate material of a given thickness, and is formed with a plurality of peanut cultivation holes 135 penetrating the plate surface. The peanut cultivation holes 135 enable germinated peanut seedlings to be loaded so that the roots a thereof can grow toward the bottom, and the hypocotyl b and the plumule c can grow toward the top.

Entry and exit portions of which the surface is gently curved are provided at the higher and the lower parts of the peanut sprout cultivation holes 135 of the peanut sprout cultivation seedbed 130. The entry and exit portions are responsible for preventing fine roots a from being damaged by hitting the upper surface and the lower surface of the seedbed body 131 when the peanut sprouts are separated from the peanut cultivation holes 135 after they are fully grown.

The water spray unit 140 supplies water to the plurality of peanut sprout cultivation seedbeds placed in the container housing 111 to enable the peanut sprouts therein to grow. The water spray unit 140 supplies water to the plurality of peanut sprout cultivation seedbeds 130 by means of the signal inputted by the cultivator.

Figure 4:
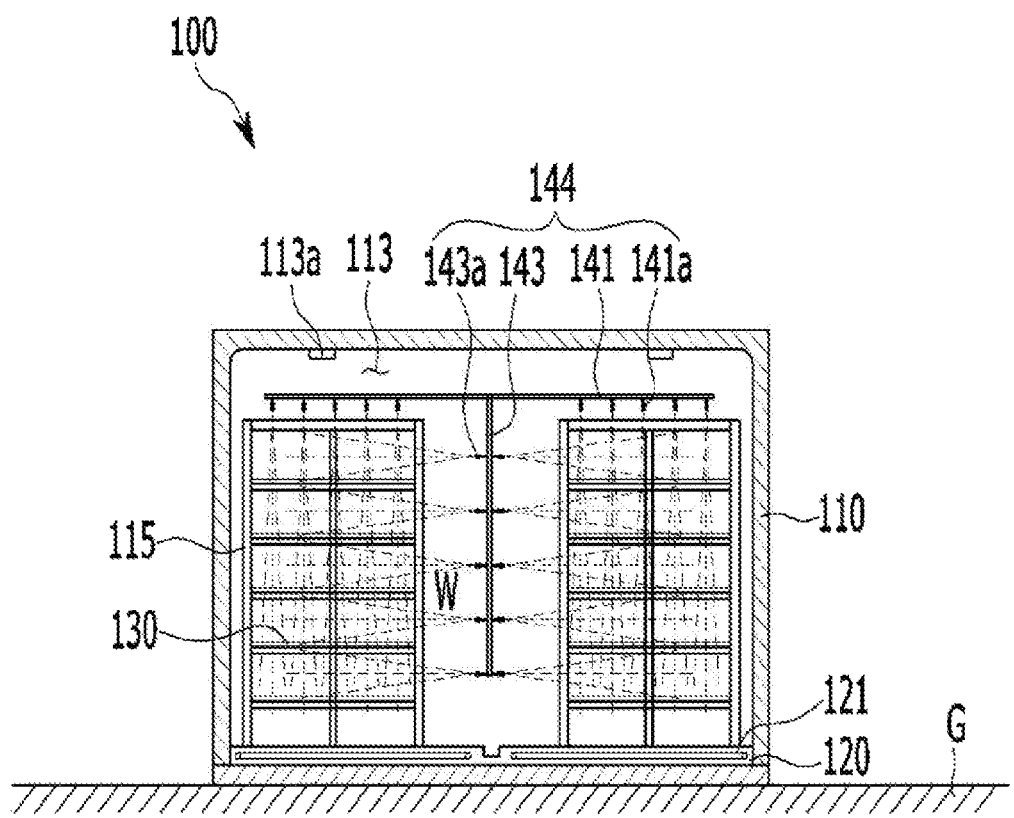
FIG. 4 illustrates a process of cultivating peanut sprouts in a container for cultivating peanut sprouts in accordance with the present disclosure.

As shown in FIGS. 3 and 4, the water spray unit 140 includes a water supply pipe 145 placed along the longitudinal direction of the container housing 111 and nozzle modules 144, 144a and 144b placed at given intervals along the water supply pipe 145.

Respective nozzle modules 144, 144a and 144b include a horizontal pipe 141 placed horizontally in the upper part of the container housing 111, and a vertical pipe 143 formed to be extended from the horizontal pipe 141 to the bottom surface in a vertical direction. The horizontal pipe 141 is provided with horizontal nozzles 141a for discharging water, and the vertical pipe 143 is provided with horizontal nozzles 143a placed right and left at given intervals.

The water supply pipe 145 supplies water in the water storage tank to the plurality of nozzle modules 144, 144a and 144b. When the cultivator applies an input signal, power is supplied to a water supply pump 148 and water is then supplied to the peanut sprout cultivation seedbeds 130.

The input signal may be manually applied by the cultivator, or automatically at the times predetermined by a timer.

The plurality of nozzle modules 144, 144a, 144b are installed in the container housing 111 at given intervals to supply water uniformly across the peanut sprout cultivation seedbeds 130 in the vertical and the horizontal directions.

The container 100 for cultivating peanut sprouts with the aforementioned configuration and in accordance with the present disclosure is described hereinafter with reference to FIGS. 2 to 5.

Peanut sprout cultivation seedbeds 130 are prepared for cultivating peanut sprouts. Peanut seedlings are placed in respective peanut cultivation holes 135 formed in the peanut sprout cultivation seedbeds 130. A cultivator loads the plurality of peanut sprout cultivation seedbeds 130 onto the seedbed benches 115 placed in the container housing 111.

While the door 117 is closed, the inside of the container housing 111 is kept dark.

The cultivator warms the inside of the container housing 111 to enable the peanuts to germinate. The cultivator drives the boiler 123 to make the temperature in the container housing 111 reach a temperature predetermined for heating. The cold water circulating through the heating pipe 121 flows into the boiler 123 through the cold water discharge pipe 121b and then heated, and the heated hot water flows into the hot water inlet pipe 121a, travels along the heating pipe 121 placed along the bottom plate 120, and warms the inside of the container housing 111. The cold water traveling in the heating pipe 121 and at a lowered temperature flows into the boiler 123 again through the cold water discharge pipe 121b.

While the inside of the container housing 111 is warmed to be at the predetermined temperature, power is supplied to the UV lamp 113a at the predetermined time periods to emit UV radiation required for cultivating peanut sprouts. The cultivator supplies power directly to the UV lamp 113a or predetermines a power supply period with a timer.

While peanut sprouts grow for approximately 6 to 8 days, the inside of container housing 111 is kept dark with the door 117 closed, and the UV lamp 113a emits UV radiation on a regular basis.

Meanwhile, the cultivator drives the water spray unit 140 and supplies water to the peanut sprouts. The cultivator supplies water at a predetermined time period. The cultivator applies power to a water supply pump 148, to supply water in the water storage tank 147 to the water supply pipe 145. Through this process, the plurality of nozzle modules 144, 144a and 144b spray peanut sprouts in the peanut sprout cultivation seedbeds 130 with water.

As shown in FIG. 4, the nozzle modules 144, 144a and 144b sprays the peanut sprouts from the upper part and the side of the peanut sprout cultivation seedbeds 130 uniformly with water.

As shown in FIG. 5, when water and light are supplied on a regular basis as described above, the peanut sprouts grow. The germinated peanut seedlings placed in the peanut sprout cultivation holes 135 of the peanut sprout cultivation seedbeds 130 are loaded to have roots a growing toward the bottom, a hypocotyl b and a plumule c growing toward the top.

After a given time period, and when peanut sprouts are fully grown, the cultivator separates the peanut sprout cultivation seedbeds 130 from the seedbed benches 115, and transports them to the outside to sell the peanut sprouts in the market. After this process, the cultivator places new peanut seedlings in the peanut sprout cultivation seedbeds 130 again and starts to cultivate them.

As described above, since the container for cultivating peanut sprouts in accordance with the present disclosure is integrated with facilities for water, light and heating required for cultivating peanut sprouts, the cultivator does not need to prepare additional apparatuses and is able immediately to start to cultivate peanut sprouts.

In addition, the cultivator does not need to input labor except applying power supply signals for power supply, cultivator's physical burden required for cultivating peanut sprouts may be reduced.

In addition, with the container for cultivating peanut sprouts in accordance with the present disclosure, peanut sprouts are cultivated in a consistent environment and the consistent quality of peanut sprouts may be achieved.

The embodiments of the container for cultivating peanut sprouts of the present disclosure described above is just an example, and it will be apparent to those skilled in the art of the present disclosure that various modifications thereof and other embodiments equivalent thereto may be implemented. Furthermore, it should be noted that the true scope of technical protection of the present disclosure is determined by the technical idea of the accompanying claims. In addition, it should be understood that the present disclosure embraces all modifications, equivalents and substitutions that may be made without departing from the idea and the scope of the present disclosure as defined in the following claims.

DESCRIPTION OF REFERENCE NUMERALS

| | |
|---|---|
| 100: peanut sprout cultivation container | 110: container unit |
| 111: container housing | 113: cultivation room |
| 113a: UV lamp | 115: seedbed bench |
| 117: door | 119: window |
| 120: bottom plate | 121: heating pipe |
| 121a: hot water inlet pipe | 121b: cold water discharge pipe |
| 123: boiler | 130: peanut sprout cultivation seedbed |
| 131: seedbed body | 133: edge member |
| 135: peanut sprout cultivation hole | 140: water spray unit |
| 141: horizontal pipe | 141a: horizontal nozzle |
| 143: vertical pipe | 143a: vertical nozzle |
| 144: nozzle module | 145: water supply pipe |
| 147: water storage tank | 148: water supply pump |

What is claimed is:

1. A container for cultivating peanut sprouts, the container comprising:
    a container body which houses peanut sprout cultivation seedbeds for cultivating peanut sprouts, and forms a cultivation room;
    a bottom plate provided at the bottom of the container body to control temperature in the container body; and
    a water spray unit provided horizontally and vertically in the container body and for supplying water to the peanut sprout cultivation seedbeds,
    wherein the bottom plate is provided with a heating pipe in which hot water is circulated by means of a boiler.

2. The container of claim 1, wherein the container unit comprises:
    a container housing;
    a door provided on one side of the container housing to be open and closed to allow a cultivator to enter and leave the container housing;
    a window provided on another side of the container housing to be open and closed for ventilation;
    a UV (ultraviolet) lamp provided in the container housing to emit UV radiation onto peanut sprouts; and
    seedbed benches for placing a plurality of peanut sprout cultivation seedbeds therein.

3. The container of claim 2, wherein the water spray unit comprises:
    a water supply pipe formed along the longitudinal direction in the upper part of the container housing;
    a plurality of nozzle modules placed at given intervals along the water supply pipe; and
    a water supply pump for supplying water in a water storage tank to the water supply pipe,
    wherein the nozzle modules comprise:
    a horizontal pipe in which the nozzle modules are placed horizontally in the upper part of the container housing, and coupled with a plurality of horizontal nozzles; and
    a vertical pipe formed to be extended to the bottom surface of the container housing to be vertical to the horizontal pipe, and coupled with a plurality of vertical nozzles.

* * * * *